United States Patent [19]

Krishnan

[11] 4,430,475
[45] Feb. 7, 1984

[54] ALKYLATED AROMATIC POLYCARBONATE COMPOSITIONS OF IMPROVED IMPACT STRENGTH

[75] Inventor: Sivaram Krishnan, Moers, Fed. Rep. of Germany

[73] Assignee: Mobay Chemical Corporation, Pittsburgh, Pa.

[21] Appl. No.: 336,211

[22] Filed: Dec. 31, 1981

[51] Int. Cl.$^3$ ............................................. C08L 69/00
[52] U.S. Cl. ...................................... 525/67; 524/504
[58] Field of Search ........................................... 525/67

[56] References Cited

U.S. PATENT DOCUMENTS

| | | | |
|---|---|---|---|
| Re. 28,723 | 2/1976 | Holder et al. | 260/873 |
| 2,991,273 | 7/1961 | Hechelhammer et al. | 528/196 |
| 3,655,824 | 4/1972 | Kato et al. | 260/873 |
| 3,742,088 | 6/1973 | Holder et al. | 260/873 |
| 3,808,180 | 4/1974 | Owens | 260/885 |
| 3,880,783 | 4/1975 | Serini et al. | 260/3 |
| 3,891,719 | 6/1975 | Schirmer et al. | 525/67 |
| 4,082,895 | 4/1978 | Backderf et al. | 525/67 |
| 4,086,296 | 4/1978 | Carty et al. | 260/857 |
| 4,096,202 | 6/1978 | Farnham et al. | 260/873 |
| 4,122,130 | 10/1978 | Fava | 260/873 |
| 4,148,842 | 4/1979 | Yu | 260/873 |
| 4,172,103 | 10/1979 | Serini et al. | 525/76 |
| 4,180,494 | 12/1979 | Fromuth et al. | 525/69 |
| 4,204,047 | 5/1980 | Margotte et al. | 525/67 |
| 4,205,141 | 5/1980 | Liebig et al. | 525/67 |
| 4,243,575 | 1/1981 | Myers et al. | 260/37 |
| 4,245,058 | 1/1981 | Liu | 525/148 |
| 4,251,647 | 2/1981 | Liu | 525/91 |
| 4,257,937 | 3/1981 | Cohen et al. | 260/40 |
| 4,260,693 | 4/1981 | Liu | 525/148 |
| 4,263,415 | 4/1981 | Liu | 525/148 |
| 4,263,416 | 4/1981 | Liu et al. | 525/148 |
| 4,299,928 | 11/1981 | Witman | 525/67 |

FOREIGN PATENT DOCUMENTS 2259564  6/1974  Fed. Rep. of Germany ........ 525/67

*Primary Examiner*—Wilbert J. Briggs, Sr.
*Attorney, Agent, or Firm*—Gene Harsh; Lawrence S. Pope; Aron Preis

[57] ABSTRACT

The invention is directed to a thermoplastic molding composition comprising alkylated polycarbonate and a dispersed polymeric phase which composition is characterized by an improved level of impact strength.

3 Claims, No Drawings

ALKYLATED AROMATIC POLYCARBONATE COMPOSITIONS OF IMPROVED IMPACT STRENGTH

FIELD OF THE INVENTION

The invention is directed to polycarbonate compositions and more particularly to nuclear alkylated polycarbonates of improved impact performance.

DESCRIPTION OF THE PRIOR ART

Polycarbonates derived from reactions involving organic dihydroxy compounds and carbonic acid derivatives have found extensive commercial application because of their excellent mechanical and physical properties. These thermoplastic polymers are particularly suited for the manufacture of molded products where impact strength, rigidity, toughness, thermal and dimensional stability as well as excellent electrical properties are required.

Alkylated aromatic polycarbonates such as are described in U.S. Pat. No. 3,879,348, which is incorporated herein by reference, are generally noted for their resistance to saponification, to hydrolysis and to aminolysis. Further, these polycarbonate resins exhibit a remarkably high resistance to deformation under load at elevated temperatures as evidenced by their performance when tested according to ASTM D-648.

On the other hand, the alkylated aromatic polycarbonate resins entailed in the present invention exhibit a distinct brittle failure when subject to relatively low impact stress.

Of interest as additional background information is U.S. Ser. No. 181,915 filed on Aug. 27, 1980 wherein taught are flame retardant versions of the alkylated polycarbonate resins of present interest. Further noted as background is U.S. Pat. No. 4,299,928 wherein disclosed are impact modified polycarbonate compositions comprising an acrylate-based graft copolymer.

It is, therefore, an object of the present invention to provide a polycarbonate resin that combines the attributes of alkylated polycarbonates with improved impact resistance.

SUMMARY OF THE INVENTION

Molding compositions characterized by an improved heat deflection temperature and by an improved impact performance comprising a matrix of nuclear alkylated aromatic polycarbonate resin and a dispersed polymeric phase selected from the group consisting of acrylate graft copolymers and butadiene graft copolymers are provided.

DETAILED DESCRIPTION OF THE INVENTION

The polycarbonate compositions of the invention comprise:

(i) a high molecular weight polycarbonate resin characterized by structural units of the formula I

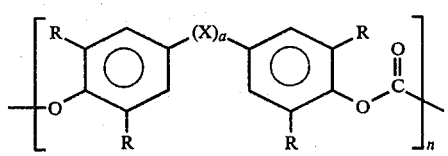

(I)

wherein
R is —CH$_3$, —C$_2$H$_5$ or —CH(CH$_3$)$_2$ and X is an alkylene or an alkylidene group having 1 to 5 carbon atoms, a cycloalkylene or a cycloalkylidene radical with 5 to 15 carbon atoms, an ether bond or a keto bond, n is at least 55 and a is 0 or 1; and (ii) a dispersed polymeric phase selected from the group consisting of acrylate graft copolymers and butadiene graft copolymers.

A. Nuclear Alkylated Polycarbonates

The polycarbonate resins of formula I above, their properties and method of preparation have been described in U.S. Pat. No. 3,879,348, incorporated by reference herein. Briefly, they may be obtained by a reaction of the corresponding alkylated bisphenols with phosgene or with the bischlorocarbonic acid esters of the alkylated bisphenols in accordance with the phase boundary polycondensation process and are characterized in that their molecular weight is between 15,000 and 200,000.

According to the phase boundary polycondensation process, polycarbonate resins are prepared by reacting the relevant aromatic dihydroxy compounds with an alkali metal hydroxide or with an alkaline earth metal oxide or hydroxide to form a salt. The salt mixture, in an aqueous solution or suspension is reacted with phosgene, carbonyl bromide, or bischloroformic esters of the aromatic dihydroxy compounds. An organic solvent is provided in the reaction admixture which is a solvent for the polymer but not for the aromatic dihydroxy salts. Chlorinated and nonchlorinated aliphatic or aromatic hydrocarbons are used as the organic solvents which dissolve the condensation product. Suitable solvents include cyclohexane, methylcyclohexane, benzene, toluene, xylene, methylene chloride, chloroform, carbon tetrachloride and chlorobenzene.

Monofunctional reactants such as monophenols may be used in order to limit the molecular weight. The alkylated polycarbonates may be branched by the incorporation therewith of small amounts, preferably of between about 0.05 and 2.0 mol % (relative to diphenols employed), of trifunctional or more than trifunctional compounds, especially, compounds having three or more phenolic hydroxyl groups.

Polycarbonates of this type are described, for example, in German Offenlegungsschriften (German Published Specifications) Nos. 1,570,533; 1,595,762; 2,116,974 and 2,113,347, British Specification No. 1,079,821 and U.S. Pat. No. 3,544,514 (incorporated herein by reference).

Some examples of compounds with three or more than three phenolic hydroxyl groups which can be used are phloroglucinol, 4,6-dimethyl-2,4,6-tri-(4-hydroxyphenyl)-heptane, 2,4,6-trimethyl-2,4,6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4',4''-dihydroxytriphenyl)-methyl)-benzene. Some of the other trifunctional compounds are 2,4-dihydroxy-benzoic acid, trimesic acid, cyanuric chloride and 3,3-bis-(4-hydroxyphenyl)-2-oxo-2,3-dihydroindole.

In order to accelerate the reaction, catalysts such as tertiary amines or quaternary ammonium must be used. The reaction temperature should be about $-20°$ to $35°+150°$ C., preferably about 0° C. to 100° C.

The following list exemplifies suitable bisphenols for the manufacture of the polycarbonate resin of formula I: Bis-(3,5-dimethyl-4-hydroxyphenyl)-methane, bis-(3,5-diisopropyl-4-hydroxyphenyl)-methane, 2,2-bis-(3-methyl-5-isopropyl-4-hydroxyphenyl)-propane, 2,2-bis-(3,5-dimethyl-4-hydroxyphenyl)-propane, 2,2-bis-(3,5-diethyl-4-hydroxyphenyl)-propane, 2,2-bis-(3,5-diethyl-4-hydroxyphenyl)-propane, 3,3-bis-(3,5-dimethyl-4-hydroxyphenyl)-pentane, 1,1-bis-(3,5-dimethyl-4-hydroxyphenyl)-cyclohexane, 1,4-bis-(3,5-dimethyl-4-hydroxyphenyl)-ether, and bis-(3,5-dimethyl-4-hydroxyphenyl)-carbonyl.

Alkylated polycarbonates of formula I are characterized by their structural stability at high temperatures as measured by heat distortion temperature, which is higher than their nonalkylated counterparts.

In the context of the practice according to the present invention, polycarbonates which nuclei are not alkylated may be blended with the nuclear alkylated polycarbonates described above.

B. DISPERSED POLYMERIC PHASE

The dispersed polymeric phase in the context of the present invention is at least one member selected from the group consisting of acrylate graft polymers or copolymers and butadiene graft polymers or copolymers. Among the acrylate graft polymers suitable in the practice of the invention are the acrylic rubber interpolymer composites which are described in U.S. Pat. Nos. 3,808,180 and 4,096,202, both incorporated by reference herein. Briefly, the technology described therein is that of the preparation of a specific class of multiphase compounds. These are compositions comprising about 25 to 95% by weight of a first elastomeric phase and about 75 to 5% by weight of a second, rigid, thermoplastic phase. The first phase is polymerized from about 75 to 99.8% by weight $C_1$ to $C_6$ acrylate resulting in an acrylic rubber core having a glass transition temperature below about 10° C. which is cross-linked with 0.1 to 5% by weight of a cross-linking monomer and to which is added 0.1 to 5% by weight of a graft-linking monomer.

The preferred alkyl acrylate is butyl acrylate. The cross-linking monomer is a polyethylenically unsaturated monomer having a plurality of addition polymerizable reactive groups all of which polymerize at substantially the same rate of reaction. Suitable cross-linking monomers include polyacrylic and polymethacrylic esters of polyols such as butylene diacrylate and dimethacrylate, trimethylol propane trimethacrylate and the like; di- and trivinyl benzene, vinyl acrylate and methacrylate, and the like. The preferred cross-linking monomer is butylene diacrylate. The graft-linking monomer is a polyethylenically unsaturated monomer having a plurality of addition polymerizable reactive groups, at least one of which polymerizing at a substantially different rate of polymerization from at least one other of said reactive groups. The function of the graft-linking monomer is to provide a residual level of unsaturation in the elastomeric phase, particularly in the latter stages of polymerization and, consequently, at or near the surface of the elastomer particles. The preferred graft-linking monomer is allyl methacrylate and diallyl maleate.

The final stage monomer system can be comprised of $C_1$ to $C_{16}$ methacrylate, styrene, acrylonitrile, alkyl acrylates, allyl methacrylate, diallyl methacrylate, and the like, as long as the over Tg is at least 20° C. Preferably, the final stage monomer system is at least 50 weight % $C_1$ to $C_4$ alkyl methacrylate. It is further preferred that the final stage polymer be free of units which tend to degrade polycarbonate.

In a preferred embodiment of the present invention the acrylate graft polymer is an acrylic rubber interpolymer composite which is available commercially from the Rohm & Haas Corporation, Philadelphia, Pa. under the trade name Acryloid ® KM-330. That modifier is characterized in that its acrylic rubber core comprises n-butyl acrylate and in that its cross-linking agent is 1,3-butylene diarylate, and in that its graft-linking agent is diallyl maleate and in that the second phase monomeric system of which is methyl methacrylate.

Additional suitable acrylate graft copolymers are those described in U.S. Pat. No. 4,022,748, incorporated by reference herein.

Among the butadiene grafts suitable in the practice of the present invention are polybutadiene or butadiene styrene or butadiene-acrylonitrile copolymers which may be at least partially cross-linked and which are grafted with copolymers of styrene and methyl methacrylate. Exemplary of the butadiene graft copolymers are those available in commerce under the trade names, Paralord ® KM 611 and KM 228, both from Rohm & Haas Corporation, Philadelphia, Pa., Kureha ® BTA3N from Kureha Chemicals and Kane Ace ® B-28, B-22 and B-56 from Kanegafuchi Chemicals Corporation of Osaka, Japan. The preferred butadiene graft is Kane Ace ® B-56.

The compositions in accordance with the invention may contain at least 65%, preferably at least 70%, by weight, relative to the weight of the composition of aromatic-nuclear-alkylated polycarbonate resin and may be prepared by intimately blending the components thereof using any of the means known in the art to be suitable for preparing homogeneous dispersions, such as kneaders, single or twin screw extruder mills and the like.

The dispersed polymeric phase may be present in the compositions of the invention at a level of between 3 and about 40, preferably between 5 and about 30 and most preferably between 10 and about 25% relative to the total weight of the polycarbonate resin and dispersed polymeric phase. It should be noted that the improved level of notched impact strength, the reduction in notch sensitivity, of the compositions of the invention is obtained without resort to any additional impact modifiers.

The compositions in accordance with the present invention may contain additives and reinforcement agents such as glass fibers and the like, fillers such as talc, clay and the like and/or any of the pigments, dyes, UV stabilizers, mold release agents or combinations thereof.

The invention is demonstrated by the following examples.

EXAMPLES

EXAMPLES 1-6

Compositions according to the invention were prepared and tested as shown in Table 1. The resin in these examples was methylated polycarbonate resin, corresponding to R being —CH₃ and X being a propylidine, in formula I above, commercially available from Bayer A. G. of Leverkusen, West Germany and is characterized in that its relative viscosity is 1.26 as measured in a 0.5% strength solution in methylene chloride. This corresponds approximately to a molecular weight of 16,000. The blends comprising the indicated components were extruded at standard temperature profile for polycarbonates on a 1½″ Waldron Hartig extruder, utilizing a 2.75/1 mixing screw.

TABLE 1

| Example | Modifier | % Modifier | Impact strength, notched Izod, ft.lbs./in. ⅛″ | Impact strength, notched Izod, ft.lbs./in. ¼″ | HDT at 264 psi °C. |
| --- | --- | --- | --- | --- | --- |
| Control | none | — | 0.74 | | 172-173 |
| 1 | acrylic rubber[1] | 10 | 2.29 | 1.97 | 162.0 |
| 2 | acrylic rubber | 15 | 3.02 | 2.45 | 159.6 |
| 3 | acrylic rubber | 20 | 3.12 | 2.9 | 165.5 |
| 4 | acrylic rubber | 25 | 3.7 | 3.24 | 165.5 |
| 5 | MBS[2] | 15 | 1.69 | 1.84 | 165.8 |
| 6 | MBS | 25 | 2.06 | 2.44 | 162.0 |

[1]Acryloid ® KM-330 from the Rohm & Haas Company, Philadelphia, Pennsylvania
[2]Kane Ace ® B56 from Kanegafuchi Chemicals, Osaka, Japan As is clearly evident upon examining the test data, the compositions according to the invention exhibit at least a two-fold increase in impact resistance over that of the unmodified resin.

EXAMPLES 7-10

Compositions comprising a resinous blend of the methylated polycarbonates mentioned above with bisphenol-A-based homopolycarbonates—available commercially from Mobay Chemical Corporation of Pittsburgh, Pa. under the trade name Merlon M-50, were modified in accordance with the practice of the invention by blending therewith the indicated modifiers. The compositions, all containing equal amounts of M-50 and the methylated polycarbonate resin described above were prepared in a fashion similar to that which was described earlier and tested accordingly. The results are tabulated below.

TABLE 2

| Example | Modifier | % Modifier | Impact Strength Notched Izod, ft.lb./in. ⅛″ | Impact Strength Notched Izod, ft.lb./in. ¼″ | HDT at 264 °C. |
| --- | --- | --- | --- | --- | --- |
| 7 | acrylic rubber[1] | 20 | 9.55 | 6.43 | 152.2 |
| 8 | acrylic rubber | 25 | 9.92 | 6.47 | 143.5 |
| 9 | MBS[2] | 15 | 3.20 | 2.69 | 146.1 |
| 10 | MBS | 25 | 2.75 | 2.59 | 132.2 |

[1]Acryloid ® KM-330 from the Rohm & Haas Company, Philadelphia, Pennsylvania
[2]Kane Ace ® B-56 from Kanegafuchi Chemicals, Osaka, Japan

What is claimed is:

1. A thermoplastic molding composition comprising
(i) a polycarbonate resin characterized in that its structural units conform to

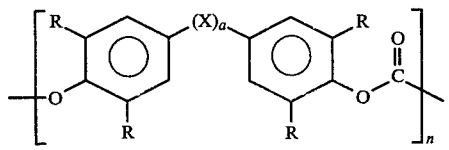

wherein R is —CH₃, —C₂H₅ or —CH(CH₃)₂, X denotes an alkylene or an alkylidene group having 1 to 5 carbon atoms, a cycloalkylene or a cycloalkylidene radical having 5 to 15 carbon atoms, an ether bond or a keto bond, a is either 0 or 1 and n is at least 55 and
(ii) a dispersed acrylic rubber interpolymeric composite comprising
 (a) about 25 to 95% by weight of a first elastomeric phase polymerized from about 75 to 99.8% by weight C₁ to C₆ acrylate, about 0.1 to 5% by weight of a cross-linking monomer and about 0.1 to 5% by weight of a graft-linking monomer and
 (b) about 75 to 5% by weight of a second, rigid thermoplastic phase,
said composition further characterized in that said (ii) is present at an amount of about 3 to 40 percent relative to the total weight of said (i) plus said (ii).

2. The composition of claim 1 wherein said acrylate is N-butyl acrylate, said cross-linking monomer is 1,3-butylene diarylate, said graft-linking monomer is diallyl maleate and said second rigid thermoplastic phase is methyl methacrylate.

3. The composition of claim 1 wherein said acrylic rubber interpolymer composite is diene-free.

* * * * *